United States Patent [19]

von Kaler et al.

[11] Patent Number: 4,726,256

[45] Date of Patent: Feb. 23, 1988

[54] VARIABLE SPEED TRANSAXLE ASSEMBLY

[75] Inventors: Roland L. von Kaler; Rocky H. Page, both of Tecumseh, Mich.

[73] Assignee: Tecumseh Products Company, Tecumseh, Mich.

[21] Appl. No.: 759,679

[22] Filed: Jul. 29, 1985

[51] Int. Cl.⁴ .................... F16H 37/00; F16H 3/44
[52] U.S. Cl. .................... 74/689; 74/695; 74/665 N; 74/793
[58] Field of Search ............ 74/689, 695, 681, 665 L, 74/665 N, 710, 793

[56] References Cited

U.S. PATENT DOCUMENTS

| | | | |
|---|---|---|---|
| 588,856 | 8/1897 | De Dion et al. | 74/689 |
| 1,426,670 | 8/1922 | Pollard | 74/711 |
| 1,543,420 | 6/1925 | Cooper | 74/689 |
| 1,623,724 | 4/1927 | Harry | 180/10 |
| 2,000,593 | 5/1935 | Happel | 74/286 |
| 2,047,840 | 7/1936 | Twomley | 74/286 |
| 2,161,894 | 6/1939 | Bishop | 74/286 |
| 2,179,933 | 11/1939 | Heyer | 74/286 |
| 2,245,392 | 6/1941 | Drill | 74/286 |
| 2,332,838 | 10/1943 | Borgward | 180/9.2 |
| 2,359,526 | 10/1944 | Locke | 74/286 |
| 2,360,076 | 10/1944 | Shaw | 74/230.17 |
| 2,410,915 | 11/1946 | Willmott | 74/286 |
| 2,478,870 | 8/1949 | Heyer | 74/230.17 |
| 2,546,869 | 3/1951 | Przybylski | 74/689 |
| 2,578,650 | 12/1951 | Wright | 74/689 |
| 2,745,297 | 5/1956 | Andrus | 74/689 |
| 2,808,738 | 10/1957 | Bartell | 74/701 |
| 2,932,216 | 4/1960 | Schou | 74/689 |
| 2,933,952 | 4/1960 | Schou | 74/689 |
| 3,003,574 | 10/1961 | Strunk | 180/70 |
| 3,015,237 | 1/1962 | Musgrave | 74/230.17 |
| 3,038,288 | 6/1962 | Deptula et al. | 56/25.4 |
| 3,040,601 | 6/1962 | Lewis | 74/740 |
| 3,059,397 | 10/1962 | Anderson et al. | 56/25.4 |
| 3,091,132 | 5/1963 | Mayfield et al. | 74/722 |

(List continued on next page.)

FOREIGN PATENT DOCUMENTS

| | | |
|---|---|---|
| 185184 | 4/1956 | Austria . |
| 520470 | 5/1953 | Belgium . |
| 6950 | 2/1955 | Fed. Rep. of Germany . |
| 2518113 | 2/1977 | Fed. Rep. of Germany . |
| 2733294 | 6/1980 | Fed. Rep. of Germany . |
| 3020510 | 12/1981 | Fed. Rep. of Germany . |
| 3226823 | 1/1984 | Fed. Rep. of Germany . |
| 1362015 | 12/1964 | France . |
| 1544765 | 11/1968 | France . |
| 372632 | 7/1939 | Italy . |
| 7504032 | 10/1975 | Netherlands . |
| 250459 | 4/1948 | Switzerland . |
| 689262 | 11/1953 | United Kingdom . |

OTHER PUBLICATIONS

"Die Planetenrad-Umlaufradergetriebe", Hugo Klein VDI, Carl Hanser Verlag, Munchen, 1962.

(List continued on next page.)

Primary Examiner—Leslie Braun
Assistant Examiner—Joseph M. Rolnicki
Attorney, Agent, or Firm—Price, Heneveld, Cooper, DeWitt & Litton

[57] ABSTRACT

A transmission/transaxle assembly for vehicles such as lawn and garden tractors which includes a housing, a dual input, a constant mesh planetary gear assembly, differential gear, axle, and output gear which transfer the planetary gear output to the differential gear and axle. The assembly reduces the rotational speed of two power inputs to a single, lower speed output and allows clutchless, infinitely variable forward, neutral and reverse output speeds by varying the rotational speed of at least one of the inputs with respect to the other. The assembly is compact and provides efficient lubrication through emersion of portions of the planetary gear assembly which continuously rotate in an oil compartment. The axes of the input shafts are arranged transverse to the axis of the output axles such that the assembly will easily accommodate vertical drive shaft engines in tractors or mowers. Output gearing transfers the reduced output of the planetary gear assembly first transverse to and then parallel to the input axes. Various differential gearing may be used while variation of the speed of one of the inputs may be made with a variable pulley assembly or other variable drive assembly.

42 Claims, 12 Drawing Figures

U.S. PATENT DOCUMENTS

| | | | |
|---|---|---|---|
| 3,131,581 | 5/1964 | Graybill | 74/740 |
| 3,245,085 | 4/1966 | Lewis | 75/665 |
| 3,251,243 | 5/1966 | Kress | 74/689 |
| 3,266,590 | 8/1966 | Hungerford | 180/70.1 X |
| 3,340,749 | 9/1967 | Magg et al. | 74/689 |
| 3,370,485 | 2/1968 | Carawan | 74/689 |
| 3,375,733 | 4/1968 | Browning | 74/689 |
| 3,406,592 | 10/1968 | von Keler | 74/710 |
| 3,481,221 | 12/1969 | Gaskins | 74/689 |
| 3,494,210 | 2/1970 | Ashton et al. | 74/230.17 |
| 3,503,279 | 3/1970 | Sievert et al. | 74/689 |
| 3,538,789 | 11/1970 | Quick et al. | 74/689 |
| 3,583,535 | 6/1971 | Plamper | 192/11 |
| 3,628,315 | 12/1971 | Bartholomew | 56/10.5 |
| 3,670,594 | 6/1972 | Roper | 74/689 |
| 3,678,786 | 7/1972 | Szekely | 74/710 X |
| 3,715,928 | 2/1973 | Case et al. | 74/218 |
| 3,731,557 | 5/1973 | Kamlukin et al. | 74/792 |
| 3,759,342 | 9/1973 | Plamper | 180/70 |
| 3,766,722 | 10/1973 | Kamlukin et al. | 56/11.6 |
| 3,777,585 | 12/1973 | Plamper | 74/230.17 |
| 3,812,735 | 5/1974 | von Kaler et al. | 74/371 |
| 3,850,050 | 11/1974 | Lemmens | 74/689 |
| 3,861,485 | 1/1975 | Busch | 74/689 X |
| 3,863,514 | 2/1975 | Jensen | 74/230.17 |
| 3,938,400 | 2/1976 | Konyha | 74/242.1 R |
| 3,999,444 | 12/1976 | Willman | 74/218 |
| 4,024,776 | 5/1977 | Stinson | 74/740 |
| 4,086,826 | 5/1978 | von Kaler | 74/713 |
| 4,103,566 | 8/1978 | von Kaler et al. | 74/701 |
| 4,128,017 | 12/1978 | Clarke | 74/230.17 |
| 4,132,121 | 1/1979 | Clarke | 74/230.17 |
| 4,176,560 | 12/1979 | Clarke | 74/230.17 A |
| 4,212,210 | 7/1980 | von Kaler et al. | 74/375 |
| 4,224,839 | 9/1980 | von Kaler | 74/701 |
| 4,232,569 | 11/1980 | Hauser et al. | 74/701 |
| 4,241,618 | 12/1980 | Smirl | 74/863 |
| 4,322,934 | 4/1982 | Doi | 56/11.1 |
| 4,329,888 | 5/1982 | Falzoni | 74/689 |
| 4,335,629 | 6/1982 | Falzoni | 74/689 |
| 4,480,501 | 11/1984 | von Kaler | 74/713 |
| 4,484,491 | 11/1984 | Cocking | 74/606 |
| 4,589,303 | 5/1986 | Roberts | 74/689 |

OTHER PUBLICATIONS

"On-The-Go Infinite Shift Transaxle for Lawn and Garden Equipment", Copyright 1971, Salsbury Division, Instrument Systems Corporation, Los Angeles, CA 90001.

"Presentation & Demonstration—Constant Horsepower Variable Speed Reversing Transmission", and excerpts from U.S. Pat. No. 3,924,489, Diamon Seven, Inc., Oct. 20, 1976.

Catalog, Peerless Gear Division, Tecumseh Products Company, Tecumseh, Mich.

VARIABLE SPEED TRANSAXLE ASSEMBLY

BACKGROUND OF THE INVENTION

This invention relates to transmission and transaxle assemblies for vehicles such as lawn and garden tractors and lawn mowers and, more particularly, to a dual input, constant mesh transmission/transaxle assembly which allows infinitely variable forward, neutral and reverse output speeds through totally mechanical means and without the need for a clutch when shifting between forward, neutral and reverse.

Conventional lawn and garden tractors, lawn mowers and other small vehicles incorporate transmissions or transaxles which typically provide several forward and at least one reverse speed as well as neutral outputs. Such vehicles are usually equipped with brake pedals, clutch pedals and shifting mechanisms which require the clutch to be depressed before any change in speed or direction. In some instances, double clutching or complete stopping of the vehicle is necessary before shifting can be achieved. This is especially difficult for women and children who use such machines. If such vehicles are operated on hills or slopes, the necessity of clutch depression can allow the machine to roll down the slope unexpectedly. At a minimum, a substantial level of coordination is required to operate vehicles using conventional clutch and shift mechanisms.

As an improvement to conventional clutch shifting transmissions, various types of variable speed transmissions have been developed which provide operation through a conveniently located single lever which merely need be pushed forward to move the vehicle in the forward direction, or pulled backward to reverse the direction of movement. The farther forward the lever is pushed, the faster the vehicle travels and vice versa.

One form of variable speed transmission now in use is a hydrostatic transmission in which a fluid drive is coupled to a conventional gear train for operation through the above-type single lever control. Such hydrostatic transmissions are relatively inefficient, especially under high heat conditions, require greater amounts of horsepower which would otherwise be available for mower or other implement operation than with other direct drive transmissions, and are relatively expensive to manufacture and install. Moreover, such hydrostatic transmissions are typically available only with horizontal drive shaft input which limits the tractor/mower configurations in which they can be installed.

Another type of variable speed transmission is a friction drive in which a traction wheel is engaged with a drive disk and is moved radially or across the center of rotation of the drive disk to vary the driven speed and/or the driven direction. Such friction drives, however, are unable to transfer large torque and, therefore, slip within certain speed or load ranges. Moreover, such systems require frequent servicing and lack reliability.

Accordingly, the need was apparent for a variable speed transmission/transaxle which would allow variable speeds in forward, neutral and reverse yet provide simple operation, preferably without the use of a clutch, through a single lever. It was also desired to have such a transmission/transaxle accommodate vertical drive shaft engines which are typical in lawn and garden tractor, lawn mower and other small vehicle installations, be inexpensive yet reliable, and eliminate inefficient power transfer typically encountered in conventionally known hydrostatic, friction or other variable speed drive units.

In addition, it was desired to provide a compact, well lubricated assembly which would require minimal maintenance and provide efficient lubrication throughout.

The present invention was conceived and designed in recognition of and as a solution for these and other problems.

SUMMARY OF THE INVENTION

The present invention is a variable speed transmission/transaxle assembly for vehicles such as lawn and garden tractors and mowers which provides clutchless operation and infinitely variable forward, neutral and reverse output speeds by varying the rotational speed of at least one of two power inputs which rotate in the same direction with respect to the other of such inputs. The assembly reduces the rotational speed of the two power inputs to a single, lower speed output in the desired forward, neutral or reverse direction.

In one form, the invention is a variable speed transmission/transaxle assembly comprising a housing, dual input planetary gear means mounted within the housing for reducing input speeds from two rotational speed sources to a single, lower speed rotational output. First input means are provided for driving a first element of the planetary gear means in a predetermined rotational direction. Second input means are also provided for driving a second element of the planetary gear means also in the same predetermined rotational direction. The input means extend from the housing on parallel rotational axes for respective connection to the power sources. At least one of the input means is adapted to be driven at a rotational speed which is variable with respect to the other of the input means. In addition, axle means rotatably mounted within and extending from the housing along an axis extending transverse to the axes of rotation of the input means for receiving wheels to be driven by the assembly are included. Further included are differential gear means for transferring rotational motion to the axle means and output gear means connected between the planetary gear means and differential gear means for transferring the lower speed rotational output to the differential gear means. The output gear means include means for transferring the lower speed rotational output first in a direction transverse to the axes of rotation of the input means, and second in a direction parallel to the axes of rotation of the input means.

In a preferred embodiment, the planetary gear means includes a sun gear, a ring gear mounted for concentric rotation with the sun gear, at least one planet gear mounted between and engaged by the sun and ring gears, and an input gear also engaging the ring gear. The planet gear is connected to and drives the output gear means. The sun gear is mounted on one of the input means while the input gear is mounted on the other of the input means. The invention encompasses various forms in which the sun gear is driven at a fixed rotational speed while the input gear drives the ring gear at a rotational speed which may be varied, and vice versa.

In other aspects, the assembly may include brake means engaging the output gear means for slowing and/or stopping rotation of the output gear means, the differential gear means and the axle means.

In yet other aspects, the housing includes a lubrication compartment which encloses at least the planetary gear means, a portion of the input means and a portion of the output gear means. At least some elements of the planetary gear means are mounted adjacent the bottom of the lubrication compartment and at least partially below a predetermined oil level therewithin. These elements are continuously driven when the input means are driven regardless of whether the axle means are being rotated in forward, neutral or reverse. Thus, continuous lubrication of the gearing within the lubrication compartment is effected when oil is contained therein and the input means are driven.

Further, various forms of differential gearing can be used with the assembly, while the inputs are preferably adapted to be driven by drive belts and pulleys. Variation in speed of the variable speed input may be obtained through a variable diameter pulley assembly or the like.

Accordingly, the transmission/transaxle assembly of the present invention provides numerous advantages over prior known variable speed transmissions. The assembly incorporates a constant mesh, planetary gear assembly which requires no clutch for operation or change in direction between forward, neutral and reverse. The output direction and speed is varied merely by changing the speed of one input drive. All of this enables easier operation of small vehicles in which the assembly is mounted on hills, slopes or by less experienced drivers. Further, the direct drive, constant mesh gearing more efficiently operates in higher temperatures where prior known fluid drives lose significant efficiency.

The present invention also enables easier installation in a broader variety of vehicles since it is easily adapted for use with engines having vertical drive shafts. Such orientation allows simpler connection of the engine to mowers and other implements. The output from the present assembly is horizontal even though the assembly has vertical input shafts adapted for connection to a vertical drive shaft engine. Further, the transverse orientation of the input and output enables efficient incorporation of a brake assembly ahead of the differential and prior to additional gear reduction while remaining close to the final drive axles. This provides increased mechanical advantage for the brake operation.

In addition, the present assembly is compact enabling easier installation in smaller vehicles as well as better and more efficient lubrication. Indeed, the constant mesh, continuously operating planetary gears provide excellent splash lubrication of gearing within the housing even when the assembly is in neutral.

Further, the assembly may be used with various types of differentials for either light or heavy duty applications, and is separate from the control mechanism for varying the input drive speeds such that those controls can be located as desired in the vehicle for efficient operation by the vehicle operator. In addition, separation of the controls for the variable speed drive input from the housing of the assembly prevents contact with lubricants from the assembly which could reduce operating efficiency.

These and other objects, advantages, purposes and features of the invention will become more apparent from a study of the following description taken in conjunction with the drawings.

DESCRIPTION OF THE PREFERRED EMBODIMENTS

Figure 1:
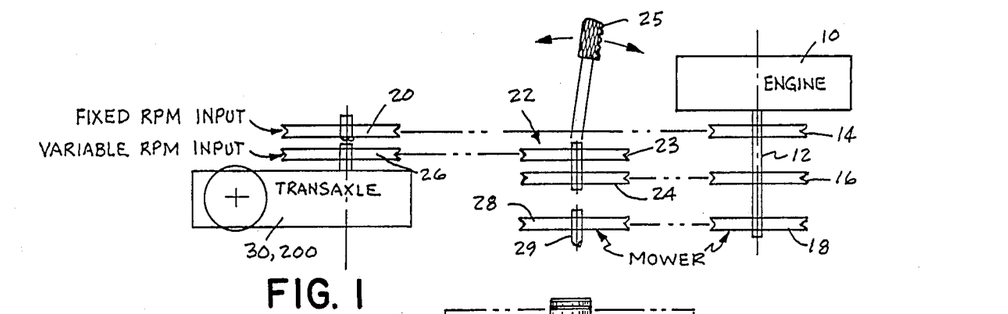
FIG. 1 is a schematic diagram of the transmission/transaxle assembly of the present invention driven by an engine through a variable diameter pulley assembly.
Figures 2, 4, 6:
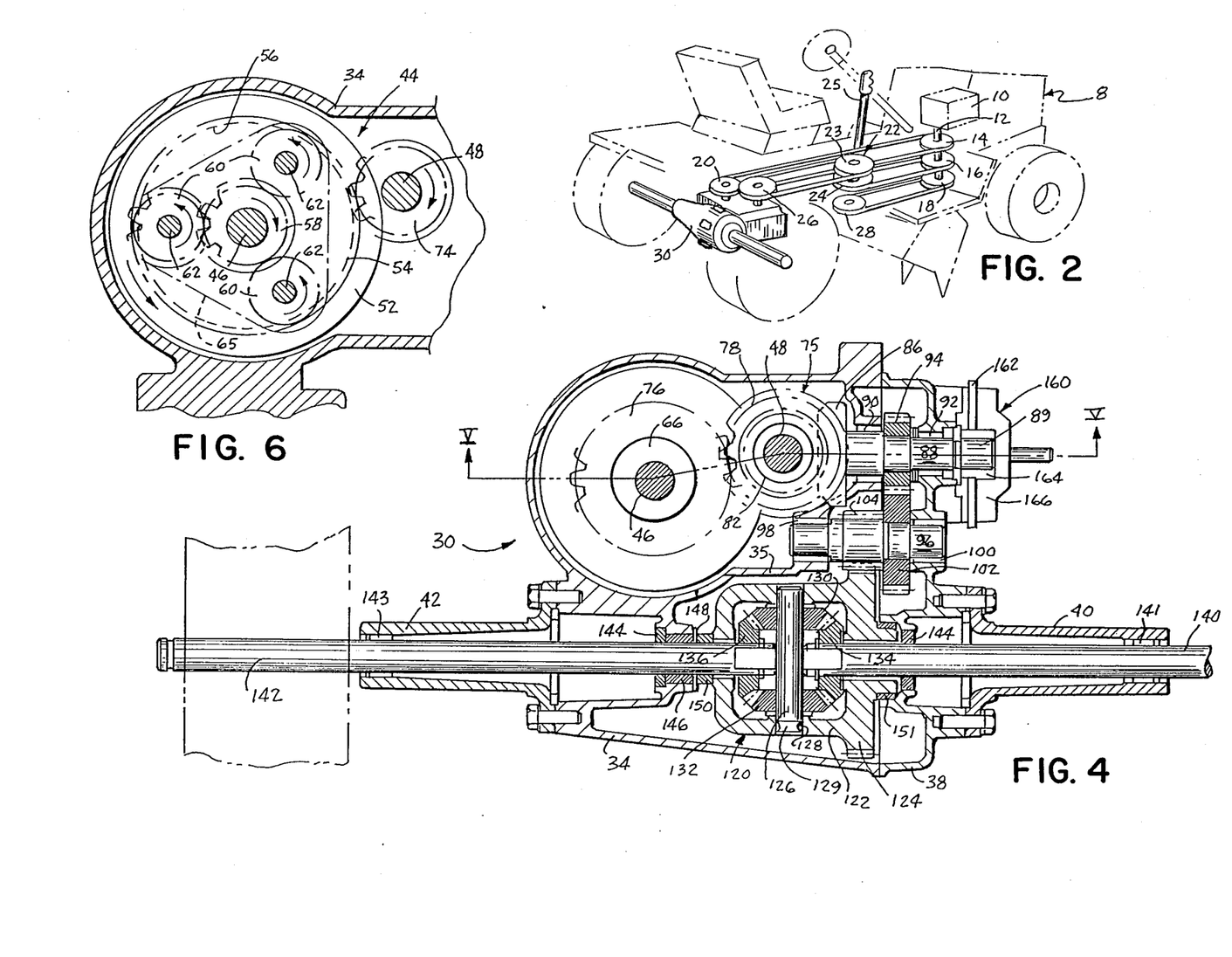
FIG. 2 is a perspective view of one of a first form of the transmission/transaxle assembly of the present invention mounted in a typical lawn and garden tractor.
FIG. 4 is a sectional plan view of the transmission/transaxle assembly taken along line IV—IV of FIG. 3.
FIG. 6 is a sectional plan view of a portion of the planetary gear assembly of the transmission/transaxle assembly taken along line VI—VI of FIG. 5.

Referring now to the drawings in greater detail, FIGS. 1 and 2 illustrate the present invention both schematically and in a typical lawn and garden tractor. A small engine 10, typically having a vertical drive shaft 12 and 8 to 20 horsepower, is mounted in the front of a lawn and garden tractor 8. Vertical drive shaft 12 includes three V-belt drive pulleys 14, 16, 18 mounted for rotation with the drive shaft. The variable speed transmission/transaxle assembly of the present invention is designed for installation in the rear of tractor 8 and may take one of several forms such as embodiment 30 or 200 as described below. The transmission/transaxle assembly allows variation in both speed and direction as well as transferring reduced rotational speed to an axle assembly incorporated in the assembly and on which the rear drive wheels of the tractor 8 are mounted. As described below, each of the transmission/transaxle assemblies 30, 200 of the present invention include dual drive power input shafts projecting from the top of a housing for connection to a power source such as engine 10.

As is also shown in FIGS. 1 and 2, the first drive pulley 14 mounted on engine drive shaft 12 is connected by a drive belt to the drive pulley 20 on the constant speed input of the transmission/transaxle, while the second drive pulley 16 is connected by drive belts through a variable pulley assembly 22 or other rotational speed varying mechanism or unit to a drive pulley 26 on the variable speed input for the transmission/transaxle. The third drive pulley 18 on engine shaft 12 is connected by a drive belt to driven pulley 28 on a drive shaft 29 for one or more lawn mower blades in the conventionally known manner.

Variable diameter pulley assembly 22 includes a pair of interconnected, simultaneously rotating belt drive pulleys 23, 24 and one of several suitable, conventionally known mechanisms operated by a single control lever such as that shown at 25 for simultaneously increasing/decreasing the diameter of pulley 23 and decreasing/increasing the diameter of pulley 24. The farther lever 25 is pushed forward, the larger the diameter of pulley 24 becomes while the diameter of pulley 23 is correspondingly decreased. Such forward movement of handle 25, therefore, successively decrease the rotational speed of input pulley 26 on transaxle 30 which increases the ground speed of the tractor. Conversely, if lever 25 is pulled rearwardly, the diameters of pulleys 23, 24 are varied oppositely and the speed of drive pulley 26 on transaxle 30, 200 is increased and the tractor ground speed is decreased. As explained below, the variation in speed of the variable input on either transmission/transaxle 30, 200 will vary the direction of rotation of the axles and drive wheels of the tractor from forward to neutral to reverse in an infinite number of speeds in each direction within a preselected range depending on the size of the pulleys in variable pulley assembly 22 and engine 10. Both input shafts continue to rotate in the same direction at all times. All variation in forward, neutral and reverse speeds can be accomplished without changing the operating speed of engine 10 which allows the mower drive pulley 28 to be continuously rotated at a constant speed to maintain mowing or other implement operation at peak efficiency. Yet, the ground speed of the vehicle can be varied as desired by the operator through the simple and efficient movement of but a single lever without changing the engine throttle setting. As described below, such continuous operation also enables more efficient lubrication of the transmission/transaxle.

Of course, the variable speed input of the transmission/transaxle assemblies of the present invention could also be driven by other variable speed drive mechanisms besides variable pulley assemblies such variable speed chain drives, friction drives or others. The type of variable speed drive will depend on the specific application desired.

Figure 5:
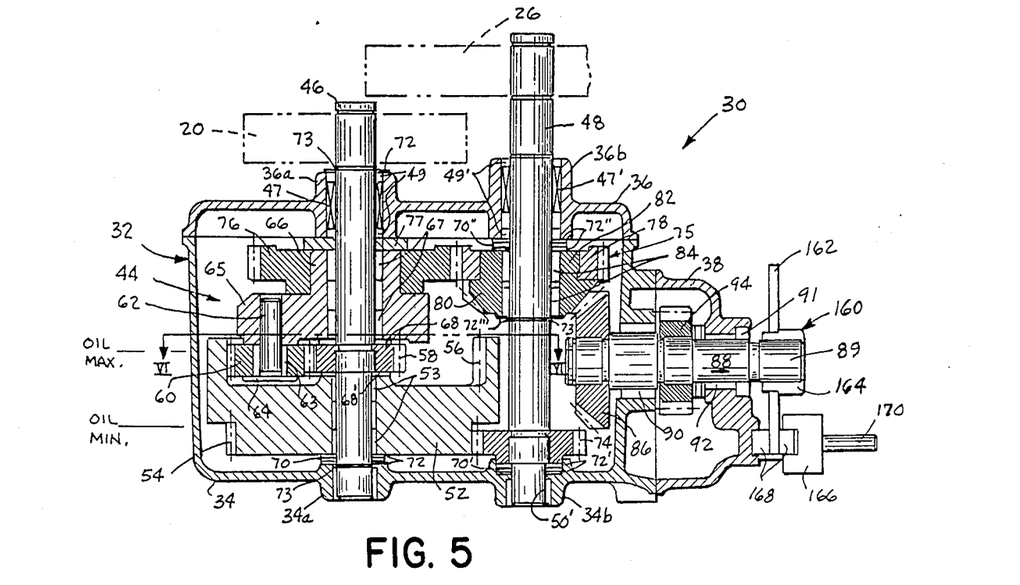
FIG. 5 is a sectional end elevation of the transmission/transaxle assembly taken along line V—V of FIG. 4.
Figure 7:
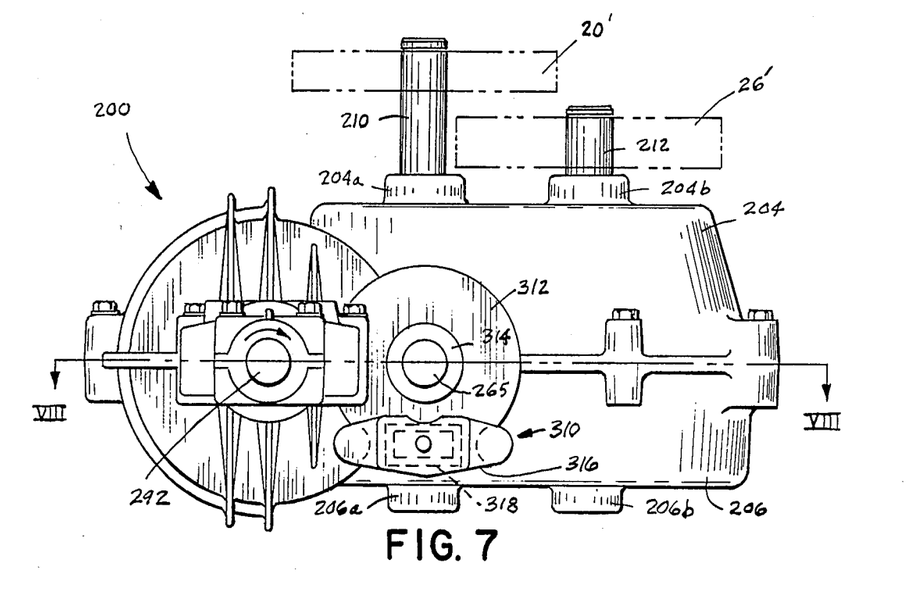
FIG. 7 is a side elevation of a second form of the transmission/transaxle assembly of the present invention.

Referring now to FIGS. 3-6, a first embodiment 30 of the transmission/transaxle assembly of the present invention for standard or heavy duty applications is shown. Assembly 30 includes a five part, cast aluminum housing 32 having a lower casing 34, an upper casing 36, a side casing 38 as well as extending axle housings 40, 42. Each of these housing casings is adapted for connection to the remaining housing portions via bolts or other threaded fasteners with appropriate lubricant gaskets or seals between the various parts. Mounted within the housing are a series of gear assemblies including planetary gear assembly 44, output gear assembly 75, differential gear assembly 120, as well as a pair of coaxial drive axles 140, 142 (FIGS. 4 and 5). In addition, the assembly may include a brake assembly 160 extending outwardly from a portion of the output gear assembly as described below.

As is best seen in FIG. 5, rotational input power is applied to the assembly through a pair of parallel input shafts 46, 48 extending between coaxial cylindrical extensions 36a, 34a and 36b, 34b on the upper and lower housing casings. Shaft 46 is rotatably mounted at its upper end in a needle roller bearing 47 sealed on either end by seals 49 within housing extension 36a and at its lower end in a closed end needle roller bearing 50 in housing extension 34a. Likewise, shaft 48, which is longer than shaft 46 and extends farther from housing 32, is rotatably mounted in needle roller bearings 47', 50' at its upper and lower ends with needle bearing 47' sealed by seals 49'.

Planetary gear assembly 44 is essentially mounted on and between shafts 46, 48 and includes an annular ring gear 52 journaled adjacent the lower end of shaft 46 on a pair of needle roller bearings 53. Ring gear 52 includes a row of external teeth 54 at its lower end and a row of internal teeth 56 at its upper end. Teeth 54 are recessed on the ring gear such that they are axially aligned with teeth 56. Also mounted on shaft 46 but on serrations or splines above the ring gear position is a sun gear 58 which rotates with shaft 46. The lower portion of shaft 46 has a slightly reduced diameter which receives sun gear 58 from its lower end such that it abuts a shoulder at the position of the sun gear shown in FIG. 5. Sun gear 58 is a spur gear having external teeth which engage three smaller diameter planet spur gears 60 which in turn engage internal teeth 56 on ring gear 52. Planet gears 60 are driven by both sun gear 58 and ring gear 56 as explained below. Planet gears 60 each have a central aperture through which is journaled an elongated cylindrical pin 62 on needle roller bearing 63 and having an enlarged head 64 which prevents the pin from passing entirely through planet gear 60. The extending upper end of pin 62 is press fitted in one aperture of a three-legged spider or planet gear carrier 65 rotatably mounted on needle roller bearings 67 on shaft 46 concentric with but above sun gear 58 and ring gear 52. Pins 62 are, thus, spaced radially from the axis of shaft 46.

Planet gear carrier 65 includes an upwardly extending, integral cylindrical hub 66 on which the first of a series of output gears 76 is mounted and is separated from sun gear 58 by a thrust washer 68. Sun gear 58 is, in turn, separated from ring gear 52 by a second thrust washer 68'. Ring gear 52 is in turn supported above the inside of housing extension 34a by a thrust bearing 70 sandwiched between thrust races 72. The entire shaft is held in place by retainer rings 73 received in recessed grooves with the top ring engaging a third thrust race 72 above upper O ring 49. Accordingly, when drive pulley 20 is mounted on the upper end of shaft 46 and rotated, the shaft rotation causes rotation of sun gear 58 which in turn provides one drive input to planet gear 60.

Mounted on the second input shaft 48 is an input spur gear 74 having a downwardly extending cylindrical hub which engages a thrust bearing 70' sandwiched between additional thrust washers 72'. Input gear 74 is received on serrations or splines on the reduced diameter lower end of shaft 48 and abuts against a shoulder on the shaft at its upper side. The teeth on input gear 74 engage external teeth 54 on ring gear 52 and provide a second drive input through the ring gear to planet gears 60 diametrically opposed to the engagement by sun gear 58 (FIG. 6). Hence, when drive pulley 26 is rotated, input gear 74 rotates in the same direction causing counter rotation of ring gear 52. Since both shaft 46 and 48 are adapted for rotation in the same direction, rotational input from sun gear 58 and the counter rotation of ring gear 52 cause rotation of planet gears 60 in a rotational direction opposite to that of sun gear 58 (see arrows in FIG. 6). Depending on the speed of rotation of sun gear 58, input gear 74 and ring gear 52, planet gears 60 will revolve clockwise, counterclockwise, or remain motionless with respect to or around the axis of shaft 46. Such motion will thus be transferred to and cause rotation of planet gear carrier 65 in the same clockwise or counterclockwise directions or be held motionless as will be more fully explained below.

Referring now to FIGS. 4 and 5, output gear assembly 75 includes output spur gear 76 keyed on hub 66 of planet gear carrier 65 and is separated from the lower end of housing extension 36a by a spacer washer 77 which may include grooves for oil retention and enhanced lubrication. Rotational motion of output gear 76 is transferred transverse to the axial direction of shafts 46, 48 to a second output spur gear 78 which is keyed to the upwardly extending hub 82 of bevel gear 80. Bevel gear 80 is journaled on needle roller bearings 84 on shaft 48 below a third thrust bearing 70" sandwiched between thrust washers 72" as at the lower end of shaft 48. Gear 80 is retained in place by a retainer ring 73 engaging another thrust race 72''' below the gear.

The rotation of output gear 78 is in turn transferred in a direction parallel to the axes of shafts 46, 48 to a second bevel gear 86 fixed to the inner end of a first output gear shaft 88 rotatably mounted in housing casings 34, 38 on needle roller bearings 90, 92. Shaft 88 is sealed in the housing by oil seal 91 adjacent its outer end. The outer end 89 of shaft 88 extends beyond housing 38 to provide a mount for a brake disk forming a part of a brake assembly 160 as described below. At the center of shaft 88, on a reduced diameter portion, is fixedly mounted a first output spur gear 94 for further transfer of the rotational motion of bevel gear 86 and shaft 88.

A second output shaft 96 (FIG. 4) is rotatably mounted between an internal wall 35 of housing casing 34 and a portion of housing casing 38 such that shaft 96 is spaced laterally from but is parallel to shaft 88. Shaft 96 is mounted in an open end needle roller bearing 98 at its inner end and a closed end needle roller bearing 100 at its outer end. Shaft 96 carries a second output spur gear 102 fixed thereto by serrations or splines immediately adjacent a row of external gear teeth 104 formed integrally on a larger diameter central section of shaft 96. The rotational motion of spur gear 94 is thus transferred through spur gear 102 and shaft 96 to gear teeth 104 which in turn engage the differential gear assembly 120 as described below.

As shown in FIG. 4, coaxial axles 140, 142 are rotatably mounted on roller bearings 141, 143 at the end of housings 40, 42 which, in turn, are closed and protected by appropriate end seals engaging the shafts. The inner ends of axles 140, 142 extend through grease seals 144 while shaft 142 is further supported by bushing 146. Differential gear assembly 120 is mounted on the inner ends of shafts 140, 142 in alignment with the row 104 of output gear teeth on shaft 96.

Differential assembly 120 includes a hollow, differential transfer gear 122 spaced from bushing 146 by a pair of washers 148, 150 such that a row of external gear teeth 124 at one end of the housing 122 is axially aligned with teeth 104 on shaft 96. Differential gear 122 is further supported by a bushing 151 at its opposite end. The hollow interior of differential transfer gear 122 receives a differential shaft 126 inserted through coaxial apertures and rotatably retained therein by a roll pin 128 received in an annular recess 129 at one end of shaft 126. Shaft 126 in turn rotatably receives a pair of bevel gears 130, 132 which engage a second pair of bevel gears 134, 136 fixed on the opposing ends of axles 140, 142 respectively. Although simultaneous rotation of both axles 140, 142 is normally caused by rotation of transfer gear 122 via teeth 124 from teeth 104 on shaft 96, increased friction on one or the other of the axles from drive wheels mounted thereon, or turning of the vehicle in which the transmission/transaxle assembly is mounted, causes one or the other of axles 140, 142 to rotate more slowly than the other. Such difference in rotational speeds of the axles is compensated for by interengaging bevel gears 130-134 in the manner of conventional differentials.

Thus, it will be understood that the rotational output from planet gear carrier 65 which is first transferred via gears 76, 78 in a direction transverse to the direction of the axes of shafts 46, 48, is then transferred parallel to the axial direction of shafts 46, 48 via bevel gears 80, 86, shafts 88, 96, spur gears 94, 102 to teeth 104 which in turn drivingly engage teeth 124 on differential transfer gear 122. Gear 122, in turn, rotates axles 140, 142 in unison in forward, neutral or reverse as controlled by the planetary gear assembly 44 described above. Axles 140, 142 extend horizontally and transverse to the axial direction of shafts 46, 48 such that drive wheels for a tractor may be easily mounted thereon while power input to vertically oriented shafts 46, 48 is easily transferred from a vertical drive shaft engine 10 as shown in FIG. 2.

As shown in FIG. 5, lower housing casing 34 is designed to retain a quantity of oil lubricant between maximum and minimum levels such that input gear 74 is emersed in the oil even at the minimum level while substantially all of ring gear 52 is emersed in the oil at the maximum level. A portion of ring gear 52 is emersed in oil at the minimum level. Since shafts 46, 48, and thus gears 74 and 52, are constantly rotated within the assembly even though the speed of rotation of shaft 48 may be varied with respect to that of shaft 46, such gears continuously splash oil within housing 34 both on themselves, shafts 46 and 48 as well as the remaining gears within the lubricant compartment within the housing casing 34 as shown in FIG. 5. Appropriate apertures through the internal walls such as wall 35 within the housing allow the oil to flow, splash and reach gears 94, 102 and 104 as well as differential assembly 120 and the inner ends of axles 140, 142. Thus, efficient lubrication of the compact gear arrangement within the housing is maintained. However, the central portions of axles 140, 142 are lubricated by grease retained within grease compartments extending between bearings 141, 143 and seals 144.

Figure 3:
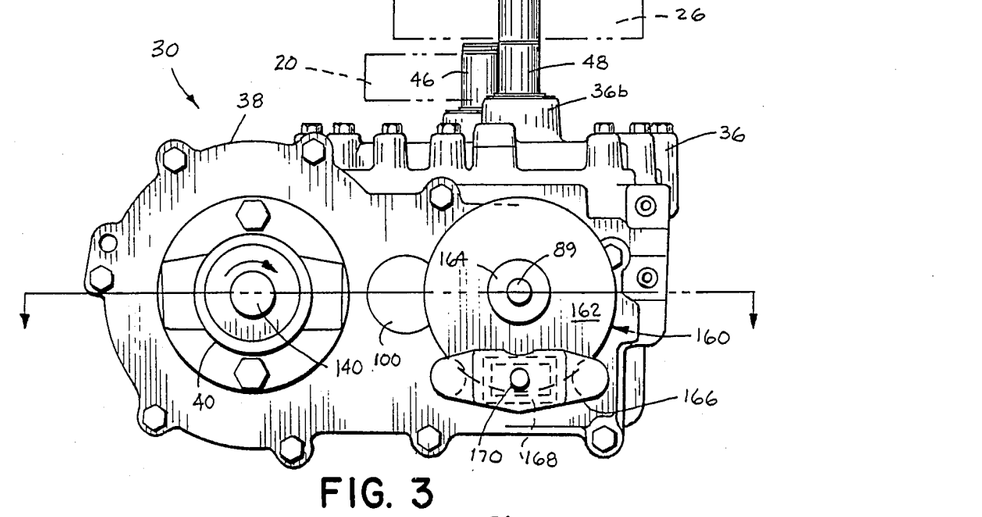
FIG. 3 is a side elevation of the first form of the transmission/transaxle assembly of the present invention.

End 89 of output gear shaft 88 extends from housing casing 38 for receipt of a brake disk 162 on a hub 164 (FIGS. 3-5). Brake disk 162 thus rotates with output shaft 88 and may be slowed, retarded or stopped completely by the application of braking pressure provided by a caliper assembly 166 having brake shoes 168 which may be applied against the rotating brake disk via an appropriate mechanism (not shown) mounted on a support pin 170 extending from the caliper assembly. Pin 170 is designed to receive a mechanism operated by a hand or foot pedal located elsewhere on the tractor or vehicle in which the transmission/transaxle assembly is mounted. Location of brake assembly 160 at shaft 88 provides braking action sufficiently close to axles 140, 142 for efficient braking and has the added advantage of being ahead of further gear reduction through shaft 96 and gear teeth 104 to the differential assembly 120 because of the reduction diameters of gears 94, 102 and 104 as well as the larger diameter of differential transfer gear 122. Brake assembly 160, therefore, provides increased mechanical advantage for retarding or stopping the rotation of axles 140, 142 and the vehicle in which the assembly is mounted.

Referring now to FIGS. 7-10, a second embodiment 200 of the variable speed transmission/transaxle assembly for lighter duty applications is shown. Embodiment 200 differs from embodiment 30 because it preferably obtains its variable speed rotational input through its sun gear within the planetary gear assembly, contains a smaller number of output shafts, gears and bearings, uses a fewer number of housing casings, and includes a different type differential gear assembly. Such differences provide embodiment 200 with a reduced load or torque capability for smaller or lighter vehicles, although the assembly will obtain similar ground speeds and provide a similar life expectancy.

Figures 8, 10, 11, 12:
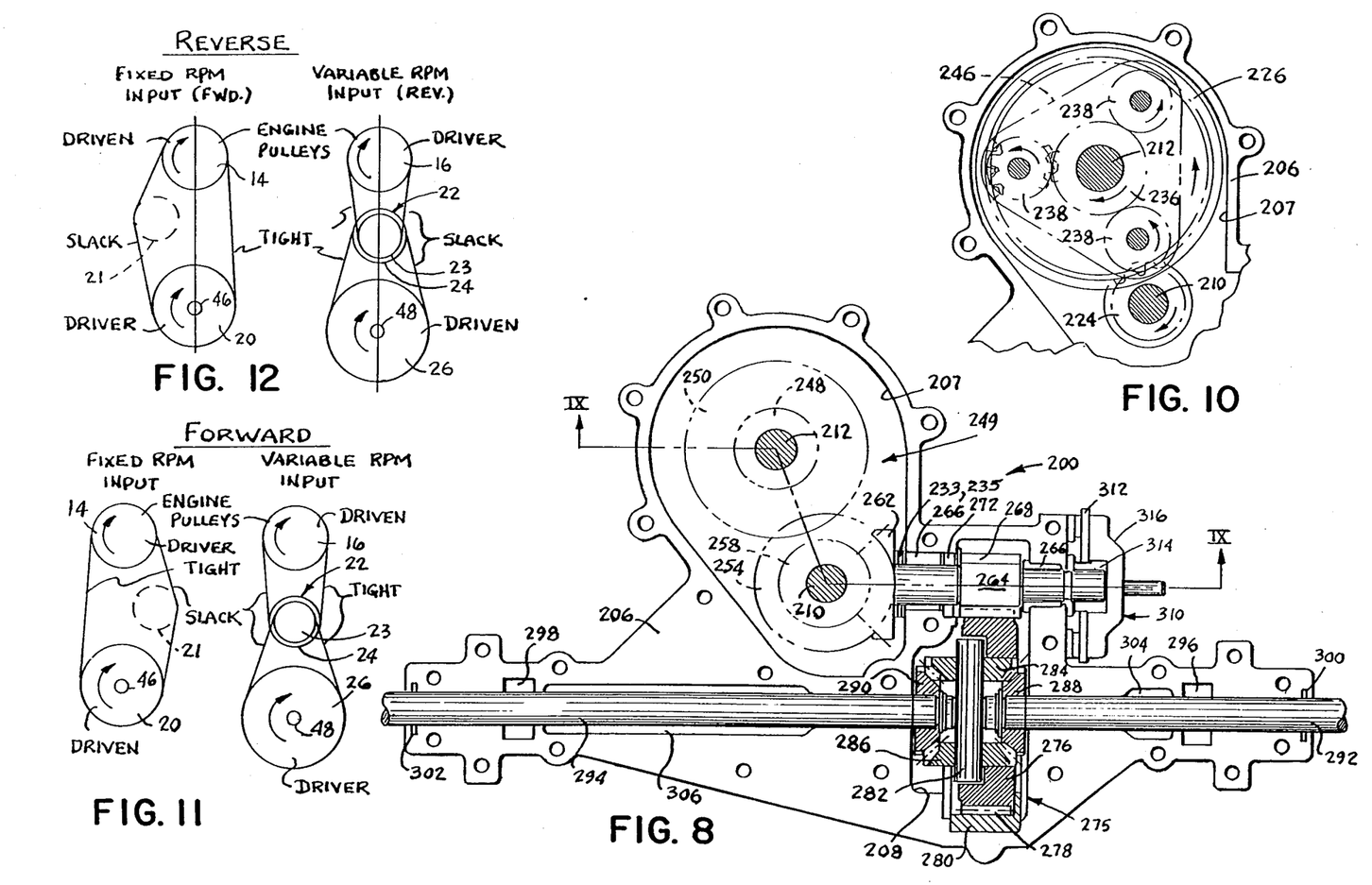
FIG. 8 is a sectional plan view of the second transmission/transaxle assembly taken along line VIII—VIII of FIG. 7.
FIG. 10 is a sectional view of the planetary gear assembly of the second transmission/transaxle assembly taken along line X—X of FIG. 9.
FIG. 11 is a schematic diagram of the belt arrangement and belt tension when the transmission/transaxle assembly is driven by a variable diameter pulley assembly in forward speeds.
FIG. 12 is a schematic diagram of the belt arrangement and belt tensions when the transmission/transaxle assembly is driven by a variable diameter pulley assembly in reverse speeds.

Assembly 200 includes a two part housing 202 having upper housing casing 204 and lower housing casing 206. Housing casings 204, 206 are joined approximately at the mid-level of the height of the assembly by a series of threaded fasteners or bolts. Casings 204, 206 form a pair of lubrication compartments 207, 208 within the housing which provide areas for separate oil lubrication of the planetary gear assembly 223 and a portion of the output gear assembly 249 and for grease lubrication of the remainder of the output gearing and the differential gear assembly 275 (FIG. 8).

Power is applied to the assembly 200 through drive pulleys 20', 26' on a pair of parallel input shafts 210, 212 which are rotatably mounted in housing extensions 204a, 206a and 204b, 206b on suitable needle roller bearings 214, 216 and 218, 220 respectively. Needle roller bearings 216, 220 are closed at the lower ends of the respective shafts. Needle bearings 214, 218, adjacent the upper end of the shafts, are enclosed by seals 222, 222'. Retainer rings 223, 223' and thrust washers 225, 225' engage shafts 210, 212 at housing extensions 204a, 204b to hold the shafts in place. Accordingly, shafts 210, 212 are rotatably within the housing.

Opposite to the manner of power input for embodiment 30, the constant speed rotational power input in embodiment 200 is provided through an input gear 224 fixed by serrations or splines at the lower end of shaft 210 such that it engages a row of external teeth 228 on ring gear 226 which is rotatably mounted at the lower end of shaft 212 on suitable needle roller bearings 230. Input gear 224 and ring gear 226 are separated from their respective housing extensions 206a, 206b by thrust bearings 232, 232' sandwiched between thrust races 234, 234'. Mounted above ring gear 226, but concentric therewith, is a sun gear 236 fixed by serrations or splines to a reduced diameter portion of shaft 212 for rotation therewith. Sun gear 236 in turn engages a series of three planet gears 238 spaced equally about its outer diameter, which planet gears in turn engage an internal row of teeth 229 on the upper side of ring gear 226. In turn, each of the planet gears 238 rotatably carries an elongated cylindrical pin 240 in a needle roller bearing 242. As with pins 62 in embodiment 30, pins 240 include enlarged heads 244 which prevent the pins from sliding through planet gears 238. Pins 240 are fixed in the respective legs of a three-legged spider or planet gear carrier 246 having an upwardly extending cylindrical hub extension 248 receiving the first of a series of output gears 250 keyed thereto for rotation with the planet gear carrier. Planet gear carrier 246 and output spur gear 250 are separated from upper housing extension 204b by a spacer washer 252 which may also include oil retaining grooves for better lubrication.

As with embodiment 30, an output gear assembly 249 first transfers the rotational output of planetary gear carrier 246 transverse to the axial direction of shafts 210, 212 and then parallel to that axial direction for engagement with a differential gear assembly and ultimate transfer of rotational power to a pair of coaxial axles. Output gear 250 engages a second output spur gear 254 keyed to the extending hub 258 of an output bevel gear 256 rotatably mounted on shaft 210 below housing extension 204a on suitable needle roller bearings 260. Bevel gear 256 and spur gear 254 are separated from housing extension 204a by a third thrust bearing 232" sandwiched between thrust races 234" as at the lower end of shafts 210, 212. Gears 254, 256 can thus rotate in the same or reverse directions with respect to the rotational direction of shaft 210 depending on the input speeds of the planetary gear assembly.

Figure 9:
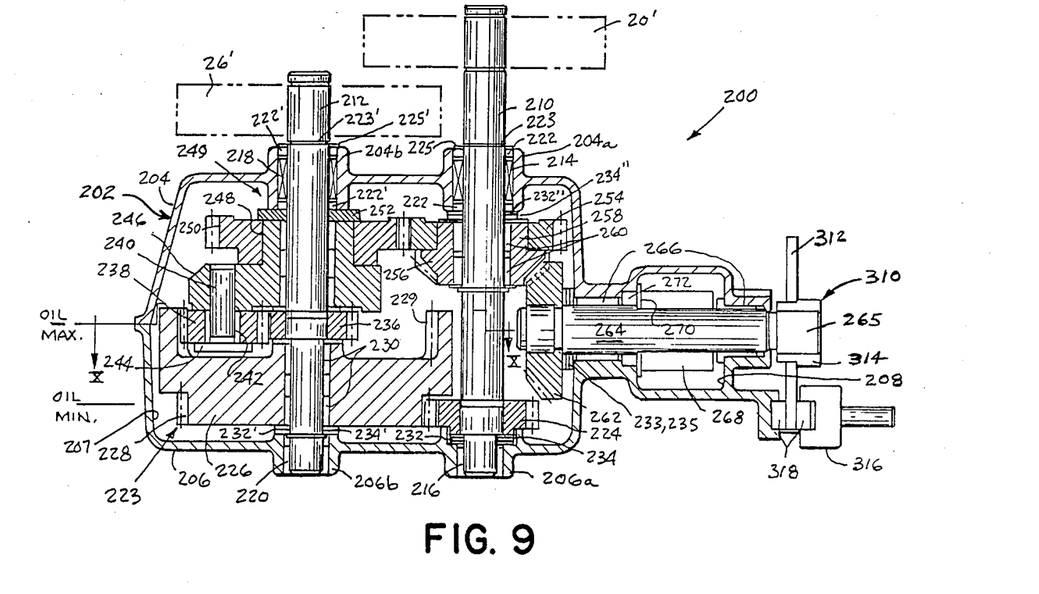
FIG. 9 is a sectional end elevation of the second transmission/transaxle assembly taken along line IX—IX of FIG. 8.

Bevel gear 256 in turn drivingly engages a second bevel gear 262 fixed on splines or serrations at the inner end of an output gear shaft 264 rotatably mounted in suitable bushings 266 between housing casings 204, 206 as shown in FIG. 9. The outer end 265 of output gear shaft 264 extends beyond the housings for mounting of a brake assembly 310 as described below. Bevel gear 262 is separated from the inside surface of housings 204, 206 by a fourth thrust bearing combination 233, 235. A central portion of output gear shaft 264 includes a row of integral gear teeth 268 thereon one side of which bear against a hardened steel washer 270 to axially position the shaft and gear teeth against the enlarged head of bushing 266 at the outer end of the shaft. An oil seal 272 is provided between steel washer 270 and bushing 266 to divide the oil lubricant compartment 207 from the grease lubricant compartment 208 as shown in FIGS. 8 and 9.

As shown in FIG. 8, teeth 268 on output gear shaft 264 are axially aligned with teeth on the differential gear assembly 275 within grease lubricant compartment 208. Differential gear assembly 275 is of the type shown and described in U.S. Pat. No. 4,480,501, issued Nov. 6, 1984 and assigned to the same assignee as the present invention, the disclosure of which is hereby incorporated by reference. In essence, differential gear assembly 275 includes an annular gear 276 rotatable on the axis of axles 292, 294 and having an external row of teeth 278 engaging teeth 268 on output gear shaft 264. Annular gear 276 is, in turn, supported on the radial outer surfaces of teeth 278 within a pair of annular bearing shoes 280 as described in U.S. Pat. No. 4,480,501. Annular gear 276 also supports a differential gear shaft 282 on which are rotatably mounted bevel gears 284, 286 which engage a second pair of bevel gears 288, 290 respectively fixedly mounted on the opposing inner ends of coaxial axles 292, 294 which extend into the differential gear assembly 275 and lubricant compartment 208. As with differential gear assembly 120 in embodiment 30 of the transmission/transaxle assembly, simultaneous rotation of axles 292, 294 is typically imparted by rotation of annular gear 276 via shaft 282 and bevel gears 284, 286. However, should one axle require slower rotation than the other, bevel gears 288, 290 compensate for such difference in rotational speeds in the manner of a conventional differential gear assembly. Axles 292, 294 are preferably supported on bearings received in pockets 296, 298, are sealed by oil seals 300, 302 and are lubricated by grease contained in grease wick pockets 304, 306.

As in embodiment 30, a brake assembly 310 may be included in embodiment 200. Brake assembly 310 includes a circular brake disk 312 fixedly mounted via hub 314 on the extending end 265 of output gear shaft 264. A caliper assembly 316, including brake shoes 318, is included to slow or stop rotation of the brake disk and thus output shaft 264, differential gear assembly 275 and axles 292, 294 when desired as in embodiment 30.

As within embodiment 30, it is also apparent that axles 292, 294 are oriented transverse to the axial direction of shafts 210, 212 such that drive wheels for a tractor or other small vehicle may be easily accommodated while transfer of rotational input power from a vertical shaft engine may easily be accommodated. Also, oil lubrication compartment 207 retains a quantity of oil between a minimum and maximum levels as shown in FIG. 9 such that input gear 224 is substantially entirely emersed at all times, even at minimum oil levels, while substantially all of ring gear 226 is emersed in the oil at the maximum level and a portion of the ring gear is emersed at minimum levels. Thus, due to the constant rotation of gears 224, 226 at all times during operation of the assembly, continuous splash lubrication of the gearing within oil compartment 207 occurs for efficient lubrication and long life. The continuous splash lubrication occurs even though the output from the transmission/transaxle is neutral or motionless. Separate grease lubrication of the remainder of the output gearing, the differential gearing and a portion of the axles is provided in grease lubricant compartment 208.

From the foregoing, the operation of either of embodiments 30 or 200 will now be understood. In each embodiment, higher rotational speed, dual input through shafts 46, 48 or 210, 212 is effectively reduced through the planetary gear assembly, output gear assembly and differential gear assembly to a single, lower speed rotational drive output at the coaxial axles. As is best seen in FIGS. 6 and 10, clockwise rotational input of input gears 74, 224 on shafts 48, 210 causes counterclockwise rotation of the planet gears 60, 238. Simultaneously, clockwise rotation of the sun gears 58, 236 on shafts 46, 212, which are rotated in the same rotational direction as shafts 48, 210 by a belt drive or other input drive from engine 10, also causes counterclockwise rotation of the planet gears 60, 238. Depending on the relative speeds of variable speed input shafts 48, 212 with respect to the constant rotational speed input shafts 46, 210 in the respective embodiments, planet gears 60, 238, and thus the pins 62, 240 which drive planet gear carriers 65, 246, will be caused to revolve in a clockwise or counterclockwise direction about shafts 46, 212, or to remain motionless, i.e., in neutral, when the rotational speeds of input gears 74, 224 through ring gears 52, 226 are matched to the rotational speeds of sun gears 58, 236. In other words, assuming the rotational speeds of shafts 46, 48 and 210, 212 are matched such that planet gears 60, 238 are rotating but not revolving about shafts 46, 212, i.e., are in neutral, a decrease in clockwise rotational speed of input gear 74 on variable speed shaft 48, or an increase in rotational speed of sun gear 236 on variable speed shaft 212, will cause an increased clockwise revolution of planet gears 60, 238 which, when transferred through the output gears in embodiments 30, 200 to axles 140, 142 or 292, 294, provides clockwise or forward rotation of the axles in each embodiment as shown by the arrows in FIGS. 3 and 7.

Conversely, an increase in the rotational speed of the variable speed input shaft 48, or a decrease in the rotational speed of variable speed input shaft 212 in embodiment 200, from the neutral rotational speed settings will cause counterclockwise rotational revolution of planet gears 60, 238 and pins 62, 240 about shafts 46, 212 causing counterclockwise rotation of axles 140, 142 and 292, 294 for reverse drive of the vehicle in which the assembly is mounted.

Accordingly, planetary gear assemblies 44, 223 as well as the output gearing 75, 249 and differential gearing 120, 275 in embodiments 30, 200 are constantly meshed and engaged throughout operation of the assemblies regardless of whether the assemblies are in forward output motion, reverse output or in neutral, i.e., zero output. As mentioned above, this constant rotation of the gearing, especially those portions adjacent the bottom of the oil lubricant compartments continuously lubricates the remaining gears for efficient, long life operation.

The change in speeds of the variable speed input shafts 48, 212 is caused through the use of a variable diameter pulley assembly such as that shown at 22 in FIGS. 1 and 2, or other variable speed drive assemblies which may be operated by simple lever movements such as variable chain drive assemblies, or variable friction drive assemblies. Any one of several of such type assemblies may be used with the present invention although variable speed belt drives are preferred because of their simplicity and reliability in use. It is, of course, possible to provide variable speed control of both input shafts 46, 48 or 210, 212 in embodiments 30, 200, although the only significant advantage obtained by varying both input speeds would be a greater output axle speed for increased ground speed of the vehicle in which the assembly is mounted. Otherwise, the mechanical advantages obtained through the reduction gearing of the present assemblies would continue to be present even when both input speeds are variable.

When belt drive systems are used with the present invention, belt tensioning in forward and reverse operation changes as shown in FIGS. 11 and 12 which are illustrated for embodiment 30 as an example. In forward speed operation as shown in FIG. 11, the variable rpm input shaft 48 is driven at a slower speed than is constant rpm input shaft 46 and sun gear 58. Hence, engine drive pulley 14 is providing drive input through a V-belt to pulley 20 as compared to engine pulley 16 which is actually being driven, in relative terms, by the reduced speed pulley 26 on the transmission/transaxle assembly through variable pulley assembly 22. Thus, in forward speeds, the left side of the drive belt between pulleys 14 and 20 is under tension with the right side being slack such that contact with an idler pulley as that shown at 21 is helpful to prevent vibration of the right belt side.

When the speed of variable shaft 48 and input gear 74 are increased relative to shaft 46 and sun gear 58 such that reverse direction output is obtained, the belt tensions are reversed as shown in FIG. 12. Thus, engine pulley 16 is, in effect, a drive pulley while engine pulley 14 is being driven, in relative terms, by pulley 20 on the transmission/transaxle assembly. In such case, the left side of the belts connecting pulley 26 with pulley 16 through variable pulley assembly 22 are tight along with the right side of the drive belt connecting pulleys 14 and 20. The opposite side of such belts are slack with long belts such as that between pulleys 14 and 20 preferably being taken up by contact with an idler pulley such as 21 as shown in FIG. 12.

Accordingly, depending on the ratios of the gearing selected for the planetary gear assemblies, output gear assemblies and differential gear assemblies in embodiments 30, 200, the present transmission/transaxle assembly can produce output ground speeds of between 3 miles per hour in the reverse direction and 6 miles per hour in the forward direction at engine speeds of from about 1,700 rpm to approximately 3,400 rpm. Such engine speeds will provide variable input shaft speeds of between about 700–800 rpm and about 3,200 rpm. For instance, at an engine speed setting of 1,700 rpm in a preferred form of embodiment 30 of the transmission/transaxle assembly, wherein the diameters of pulleys 14, 20 are set to provide a constant rpm for shaft 46 of 1,530 rpm, a variable pulley assembly having a range of approximately 760 rpm to approximately 1,600 rpm for shaft 48 will allow ground speeds of between 1 mile per hour in reverse and approximately 2.5 miles per hour in forward. However, when the engine speed is increased to 3,400 rpm with a constant rotational speed of 3,060 rpm for shaft 46, and a rotational speed range of between 1,528 and 3,209 rpm for shaft 48 via the variable diameter pulley assembly 22, ground speeds using control lever 25 may be varied between 2 miles per hour in reverse and 5 miles per hour in forward.

Accordingly, the present invention provides appropriate ground speeds while maintaining constant speed mower or other implement operation through power inputs which are constantly rotating in the same direction. Preferably, one of the inputs is varied through the variable diameter pulley assembly and single lever control. At least a portion of the gearing within the assembly is constantly in motion to provide continuous splash lubrication within the housing to increase reliability and life span for the assembly. The assembly also provides a convenient location for including a brake assembly, and yet allows incorporation of various types of differentials depending on the load ranges to be encountered by the specific assembly in question. Further, each embodiment of the assembly provides a balance between output torque and speed to optimize running conditions. Thus, both assemblies provide reduction gearing which allows higher torque at lower operating speeds and yet may be operated at higher input speeds and reduced output loads for greater ground speed.

While several forms of the invention have been shown and described, other forms will not be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are as follows:

1. A variable speed transmission/transaxle assembly for vehicles such as lawn and garden tractors and mowers comprising:
   a housing;
   dual input planetary gear means mounted within said housing for reducing input speeds from two rotational speed drive sources to a single, lower speed rotational output;
   first input means for driving a first element of said planetary gear means in a predetermined rotational direction;
   second input means for driving a second element of said planetary gear means also in said predetermined rotational direction;
   said first and second input means spaced from one another and extending from said housing on separate, parallel rotational axes for respective connection to the drive sources; at least one of said first and second input means adapted to be driven at a rotational speed which is variable with respect to the other of said input means;
   axle means rotatably mounted within and extending from said housing along an axis extending transverse to said axes of rotation of said input means for receiving wheels to be driven by the assembly;
   differential gear means for transferring rotational motion to said axle means;
   output gear means connected between said planetary gear means and differential gear means for transferring said lower speed rotational output from said planetary gear means to said differential gear means; said output gear means including interengaging gear means mounted for rotation on said separate input means and engaging said planetary gear means for transferring said lower speed rotational output in a direction transverse to said axes of rotation of said input means, and additional gear means engaging said interengaging gear means for transferring said lower speed rotational output in a direction parallel to said axes of rotation of said input means for transfer to said differential gear means; means for rotatably mounting said additional gear means on said housing;
   whereby said gear means constantly mesh and require no clutch for changing between forward, neutral and reverse, said assembly being compact with said input means, differential means and axle means adjacent one another in said housing and allowing efficient lubrication of the various gear means within said housing while obtaining variable speed forward, neutral and reverse rotation of said axle means as desired by varying the speed of rotation of at least one of said input means with respect to the rotational speed of the other of said input means.

2. The assembly of claim 1 wherein said first input means is adapted to be driven at a first, constant rotational speed; said second input means being adapted to be driven at second rotational speed which is variable with respect to said first speed.

3. The assembly of claim 2 wherein said planetary gear means includes a sun gear, a ring gear mounted for concentric rotation with said sun gear, at least one planet gear mounted between and engaged by said sun and ring gears, and an input gear engaging said ring gear, said planet gear connected to and driving said interengaging gear means; said sun gear mounted on one of said first and second input means; said input gear mounted on the other of said first and second input means.

4. The assembly of claim 3 wherein said first and second input means are first and second parallel, rotatable, input shafts extending through said housing; said sun gear fixedly mounted on said first input shaft for rotation therewith; said input gear fixedly mounted on said second input shaft for rotation therewith.

5. The assembly of claim 3 wherein said first and second input means are first and second parallel, rotatable input shafts extending through said housing; said sun gear being fixedly mounted on said second input shaft for rotation therewith; said input gear being fixedly mounted on said first input shaft for rotation therewith.

6. The assembly of claim 3 wherein said first and second input means are first and second parallel, rotatable, input shafts extending through said housing; said ring gear being rotatably mounted on said input shaft on which said sun gear is mounted, said ring gear including an internal, annular row of teeth engaged by said planet gear and external, annular row of teeth engaged by said input gear.

7. The assembly of claim 6 wherein said interengaging gear means include a planet gear carrier rotatably mounted on said input shaft on which said sun and ring gears are mounted; a pin fixedly secured to said planet gear carrier at a position spaced from said input shaft on which said carrier is mounted; said planet gear rotatably mounted concentrically on said pin.

8. The assembly of claim 7 wherein said interengaging gear means further include a first output gear rotatably mounted concentrically with respect to said first input shaft and a second output gear rotatably mounted concentrically with respect to said second input shaft; said planet gear carrier connected to said first output gear; said second output gear engaging said first output gear and said additional gear means.

9. The assembly of claim 8 wherein wherein said means for rotatably mounting said additional gear means include a third shaft rotatably mounted on said housing and extending transverse to the axes of rotation of said input shafts and a fourth shaft extending parallel to said third shaft and rotatably mounted on said housing; said additional gear means including a third gear engaging said second output gear and mounted on said third shaft and a fourth gear mounted on said fourth shaft for engaging said third gear and said differential gear means.

10. The assembly of claim 9 wherein said third shaft extends through said housing; brake means on said third shaft outside said housing for slowing/stopping the rotation of said output gear means, differential gear means and axle means.

11. The assembly of claim 3 wherein said first and second input means are first and second parallel, rotatable input shafts extending through said housing and adapted to receive drive means thereon; at least one of said input shafts being longer than the other and extending a greater distance from said housing.

12. The assembly of claim 11 wherein said input shaft including said input gear is longer than the other input shaft.

13. The assembly of claim 3 wherein said housing includes a lubrication compartment enclosing said sun gear, ring gear, planet gear, input gear, portions of said first and second input means, and a portion of said output gear means; said ring gear and input gear being mounted adjacent the bottom of said lubrication compartment and at least partially below a predetermined oil level within said compartment; said sun gear, ring gear, input gear and planet gear adapted to be continuously driven when said first and second input means are driven regardless of whether said axle means are being rotated in forward, neutral or reverse direction whereby continuous lubrication of the gearing within said compartment is effected when oil is contained therein and said first and second input means are driven.

14. The assembly of claim 3 wherein said interengaging gear means include a planet gear carrier; said planet gear rotatably mounted on said planet gear carrier; said sun, planet and input gears having diameters smaller than said ring gear such that rotational speed from said input means is reduced at said planet gear carrier; said output gear means having diameters smaller than said differential gear means whereby the rotational speed from said planet gear carrier is further reduced by said output and differential gear means.

15. The assembly of claim 1 including brake means engaging said means for rotatably mounting said additional gear means for slowing/stopping rotation of said output gear means, differential gear means and axle means.

16. The assembly of claim 15 wherein said brake means includes a brake shaft extending through said housing parallel to said axle means and means external of said housing for restricting rotation of said brake shaft.

17. The assembly of claim 1 wherein said housing includes a first lubrication compartment therewithin enclosing said planetary gear means, a portion of said first and second input means within said housing and a portion of said output gear means.

18. The assembly of claim 17 wherein at least some elements of said planetary gear means are mounted adjacent to the bottom of said first lubrication compartment and at least partially below a predetermined oil level within said first compartment; said planetary gear means elements adapted to be driven continuously when said first and second input means are driven regardless of whether said axle means are being rotated in forward, neutral or reverse directions whereby continuous lubrication of the gearing within said first compartment is effected when oil is contained therein and said first and second input means are driven.

19. The assembly of claim 17 including a second lubrication compartment enclosing said differential gear means and a portion of said axle means.

20. The assembly of claim 1 wherein said first and second input means extend along vertical axes of rotation; said axle means extend along a horizontal axis of rotation; said means for rotatably mounting said additional gear means including a shaft mounted on a horizontal rotational axis which is offset from said differential gear means.

21. The assembly of claim 1 wherein said rotational axis of one of said first and second input means is in a first plane spaced a first distance from said axis of said axle means; said rotational axis of the other of said input means being in a second plane spaced a second distance from said axis of said axle means.

22. The assembly of claim 1 wherein said differential gear means includes a hollow transfer gear drivingly engaged by said output gear means; said axle means including a pair of coaxial axles extending into said transfer gear; said transfer gear including four interengaging bevel gears therewithin; two of said bevel gears being fixedly mounted on opposing ends of said axles; the remaining two bevel gears being rotatably mounted coaxially on an axis extending transverse to the axis of said axles.

23. The assembly of claim 1 wherein said axle means includes a pair of coaxial axles rotatably mounted in said housing and having opposing inner ends; said differential gear means including an annular gear engaged by said output gear means, a first pair of bevel gears rotatably coaxially mounted transverse to the axis of said axles within said annular gear, and a second pair of bevel gears engaging said first pair of bevel gears, said second pair of bevel gears being respectively fixedly mounted on said opposing ends of said axles; said annular gear being supported adjacent said inner ends of said axles by its radial outer surfaces on at least one annular bearing shoe supported within said housing.

24. The assembly of claim 1 in combination with variable speed drive means connected to said one of said first and second input means for rotating said one input means in a desired direction at a selected speed as desired; said variable speed drive means including control means for varying the rotational speed of said one input means within a range of rotational speeds; constant speed drive means connected to the other of said first and second input means for rotating said other input means in the same rotational direction as said one input means but at a preselected constant rotational speed.

25. The assembly of claim 24 wherein said variable speed drive means is a pulley assembly having a pair of interconnected, simultaneously rotating, belt drive pulleys, one pulley adapted to be driven by a drive belt connected to a power source, the other pulley connected to said one input means by a drive belt; said control means including means for increasing or decreasing the diameter of one pulley while the diameter of the other pulley is simultaneously decreased or increased proportionately.

26. The assembly of claim 1 wherein said means for rotatably mounting said additional gear means include a third shaft rotatably mounted on said housing and extending transverse to the axes of rotation of said input means; said additional gear means including a third gear means mounted on said third shaft for engaging said second gear means and said differential gear means.

27. A variable speed transmission/transaxle assembly for vehicles such as lawn and garden tractors or mowers comprising:

a planetary gear assembly having a sun gear, a ring gear having internal and external teeth, and at least one planet gear engaged between said sun gear and said internal teeth of said ring gear and adapted to be driven in a revolving motion about said sun gear;

first and second rotatable input shafts spaced from one another and having separate, parallel axes of rotation;

said sun gear mounted for rotation with the first of said input shaft, said ring gear mounted for rotation about said first input shaft; a drive gear engaging said external teeth of said ring gear and mounted for rotation with the second of said input shafts;

each of said input shafts adapted to be driven by drive source in the same rotational direction; at least one of said input shafts adapted to be driven at a constant rotational speed; the other of sid input shafts adapted to be driven at a selected rotational speed which may be varied within a predetermined range;

rotatable axle means for receiving wheels to be driven by said transmission/transaxle assembly;

differential gear means for transferring rotational motion to said axle means;

output gear means for transferring the revolving motion of said planet gear to said differential gear means; said output gear means having a plurality of gear which first transfer said revolving motion transverse to said axes of rotation of said input shafts and then transfer said motion parallel to said input shaft axes; said plurality of gears including a first gear means rotatably mounted on said first input shaft for engaging and driving a second gear, said planet gear rotatably mounted on said first gear means, said second gear rotatably mounted on said second input shaft and engaging said first gear means, and additional gear means for engaging said second gear and transferring the rotational output of said second gear to said differential gear means; means for rotatably mounting said additional gear means for rotation in a plane extending parallel to said rotational axes of said first and second input shafts; said first gear means and said second gear transferring said lower speed rotational output in said transverse direction while said second and additional gear means transfer said output in said parallel direction; and housing means for supporting and enclosing said planetary gear assembly, said output gear means, said differential gear means and portions of said input shafts and said axle means whereby said assembly is compact with said portions of said input shafts, said differential gear means and said axle means adjacent one another in said housing means, said various gears and gear means constantly meshing to obtain variable speed forward, neutral and reverse rotation of said axle means as desired by varying the speed of rotation of one of said input shafts with respect to the rotational speed of the other input shaft.

28. The assembly of claim 27 wherein said means for rotatably mounting said additional gear means include a third shaft rotatably mounted on said housing means and extending transverse to the axes of rotation of said input shafts; third gear means on said third shaft for engaging said second gear on said second input shaft and fourth gear means for drivingly engaging said differential gear means, said fourth gear means mounted on a fourth shaft which extends parallel to but spaced from said third shaft and is rotatably mounted on said housing means.

29. The assembly of claim 28 wherein said third shaft extends through said housing means; brake means on said third shaft outside said housing means for slowing/stopping the rotation of said output gear means, differential gear means and axle means.

30. The assembly of claim 27 wherein said housing means include a lubrication compartment enclosing said sun gear, ring gear, planet gear, input gear, portions of said first and second input shafts, and a portion of said output gear means; said ring gear and input gear being mounted adjacent the bottom of said lubrication compartment and at least partially below a predetermined oil level within said compartment; said sun gear, ring gear, input gear and planet gear adapted to be continuously driven when said first and second input shafts are driven regardless of whether said axle means are being rotated in forward, neutral or reverse direction whereby continuous lubrication of the gearing within said compartment is effected when oil is contained therein and said first and second input shafts are driven.

31. The assembly of claim 27 wherein said housing means includes a first lubrication compartment therewithin enclosing said planetary gear assembly, a portion of said first and second input shafts within said housing means and a portion of said output gear means; and a second lubrication compartment enclosing said differential gear means, a portion of said axle means, and another portion of said output gear means.

32. The assembly of claim 27 wherein said first and second input shafts extend along vertical axes of rotation; said axle means extend along a horizontal axis of rotation; said means for rotatably mounting said additional gear means incluidng a shaft mounted on a horizontal rotational axis which is offset from said differential gear means.

33. The assembly of claim 27 including brake means engaging said means for rotatably mounting said additional gear means for slowing/stopping rotation of said output gear means, differential gear means and axle means.

34. The assembly of claim 33 wherein said brake means includes a brake shaft extending through said housing means parallel to said axle means and means external of said housing means for restricting rotation of said brake shaft.

35. The assembly of claim 27 in combination with variable speed drive means connected to said one of said first and second input shafts for rotating said one input shaft in a desired direction at a selected speed as desired; said variable speed drive means including control means for varying the rotational speed of said one input shaft within a range of rotational speeds; constant speed drive means connected to the other of said first and second input shafts for rotating said other input shaft in the same rotational direction as said one input shaft but at a preselected constant rotational speed.

36. The assembly of claim 27 wherein said additional gear means and means for rotatably mounting said additional gear means include a first bevel gear rotatably mounted on said second input shaft and connected to and driven by said second gear and a second bevel gear mounted on a third shaft, said third shaft rotatably mounted on said housing means parallel to but spaced from said axle means, and extending transverse to the axes of rotation of said input shafts, said third shaft including third gear means for driving said differential gear means.

37. The assembly of claim 36 including a fourth shaft rotatably mounted on said housing means parallel to and spaced from said third shaft; said fourth shaft having fourth gear means for engaging said third gear means and drivingly engaging said differential gear means.

38. A variable speed transmission/transaxle assembly for vehicles such as lawn and garden tractors and mowers comprising:
a housing;
dual input planetary gear means mounted within said housing for reducing input speeds from two rotational speed drive sources to a single, lower speed rotational output;
first and second input means extending from said housing on separate, parallel rotational axes for respective connection to the drive sources, said rotational axes extending vertically; at least one of said first and second input means adapted to be driven at a rotational speed which is variable with respect to the other of said input means;
axle means rotatably mounted within and extending horizontally from said housing for receiving wheels to be driven by the assembly;
differential gear means mounted within said housing for transferring rotational motion to said axle means;
output gear means connected between said planetary gear means and differential gear means for transferring said lower speed rotational output from said planetary gear means to said differential gear means;
said assembly allowing variable speed forward, neutral and reverse rotation of said axle means as desired by varying the speed of rotation of one of said input means with respect to the rotational speed of the other of said input means;
said housing including a lubrication compartment adapted to hold a predetermined quantity of lubricant therein, said lubrication compartment enclosing said planetary gear means, a portion of said first and second input means and a portion of said output gear means; at least some elements of said planetary gear means being mounted for horizontal rotation on said vertical axes of rotation of said input means; said elements of said planetary gear means being located adjacent the bottom of said lubrication compartment at least partially below a predetermined oil level within said compartment; said elements of said planetary gear means adapted to be driven continuously when said first and second input means are driven regardless of whether said axle means are being rotated in forward, neutral or reverse directions and causing splashing and dispersion of oil within said compartment whereby continuous lubrication of the gearing within said compartment is effected when oil is contained therein and said first and second input means are driven;
said housing further including means defining a second lubrication compartment adapted to receive a different lubricant than that contained in the first lubrication compartment and enclosing said differential gear means and a portion of said axle means; at least one element of said output gear means extending between the first and said second lubrication compartments; seal means for preventing lubricant communication between said compartments mounted on said means defining said second lubricant compartment and engaging said element of said output gear means.

39. A variable speed transmission/transaxle assembly for vehicles such as lawn and garden tractors and mowers comprising:
a housing;
dual input planetary gear means mounted within said housing for reducing input speeds from two rotational speed drive sources to a single, lower speed rotational output;
first and second input means extending from said housing on separate, parallel rotational axes for respective connection to the drive sources, said rotational axes extending vertically; at least one of said first and second input means adapted to be driven at a rotational speed which is variable with respect to the other of said input means;

axle means rotatably mounted within and extending horizontally from said housing for receiving wheels to be driven by the assembly;

differential gear means mounted within said housing for transferring rotational motion to said axle means;

output gear means connected between said planetary gear means and differential gear means for transferring said lower speed rotational output from said planetary gear means to said differential gear means;

said assembly allowing variable speed forward, neutral and reverse rotation of said axle means as desired by varying the speed of rotation of one of said input means with respect to the rotational speed of the other of said input means;

said housing including a lubrication compartment adapted to hold a predetermined quantity of lubricant therein, said lubrication compartment enclosing said planetary gear means, a portion of said first and second input means and a portion of said output gear means; at least some elements of said planetary gear means being mounted for horizontal rotation on said vertical axes of rotation of said input means; said elements of said planetary gear means being located adjacent the bottom of said lubrication compartment at least partially below a predetermined oil level within said compartment; said elements of said planetary gear means adapted to be driven continuously when said first and second input means are driven regardless of whether said axle means are being rotated in forward, neutral or reverse directions and causing splashing and dispersion of oil within said compartment whereby continuous lubrication of the gearing within said compartment is effected when oil is contained therein and said first and second input means are driven.

40. The assembly of claim 39 including brake means engaging said output gear means for slowing/stopping rotation of said output gear means, differential gear means and axle means.

41. A variable speed transmission/transaxle assembly for vehicles such as lawn and garden tractors and mowers comprising:

a housing;

dual input planetary gear means mounted within said housing for reducing input speeds from two rotational speed drive sources to a single, lower speed rotational output;

first and second input means extending from said housing on separate, parallel rotational axes for respective connection to thw drive sources, said rotational axes extending vertically; at least one of said first and second input means adapted to be driven at a rotational speed which is variable with respect to the other of said input means;

axle means rotatably mounted within and extending horizontally from said housing for receiving wheels to be driven by the assembly;

differential gear means mounted within said housing for transferring rotational motion to said axle means;

output gear means connected between said planetary gear means and differential gear means for transferring said lower speed rotational output from said planetary gear means to said differential gear means;

said assembly allowing variable speed forward, neutral and reverse rotation of said axle means as desired by varying the speed of rotation of one of said input means with respect to the rotational speed of the other of said input means;

said housing including a lubrication compartment adapted to hold a predetermined quantity of lubricant therein, said lubrication compartment enclosing said planetary gear means, a portion of said first and second input means and a portion of said output gear means; at least some elements of said planetary gear means being mounted for horizontal rotation on said vertical axes of rotation of said input means; said elements of said planetary gear means being located adjacent the bottom of said lubrication compartment at least partially below a predetermined oil level within said compartment; said elements of said planetary gear means adapted to be driven continuously when said first and second input means are driven regardless of whether said axle means are being rotated in forward, neutral or reverse directions and causing splashing and dispersion of oil within said compartment whereby continuous lubrication of the gearing within said compartment is effected when oil is contained therein and said first and second input means are driven;

said planetary gear means including a sun gear, a ring gear mounted for concentric rotation with said sun gear, at least one planet gear mounted between and engaged by said sun and ring gears, and an input gear engaging said gear; a planet gear carrier for rotatably supporting said planet gear; said planet gear connected to and driving said output gear means through said planet gear carrier; said sun gear and ring gear mounted on one of said first and second input means; said input gear mounted on the other of said first and second input means; said lubrication compartment enclosing said sun gear, ring gear, planet gear and input gear; said ring gear and input gear being mounted for horizontal rotation on said first and second input means adjacent the bottom of said lubrication compartment and at least partially below a predetermined oil level within said compartment; said sun gear, ring gear, input gear and planet gear adapted to be continuously driven when said first and second input means are driven regardless of whether said axle means are being rotated in forward, neutral or reverse direction such that said ring gear and input gear cause continuous lubrication of the gearing within said compartment.

42. A variable speed transmission/transaxle assembly for vehicles such as lawn and garden tractors and mowers comprising:

a housing;

dual input planetary gear means mounted within said housing for reducing input speeds from two rotational speed drive sources to a single, lower speed rotational output;

first input means for driving a first element of said planetary gear means in a predetermined rotational direction;

second input means for driving a second element of said planetary gear means also in said predetermined rotational direction;

said first and second input means spaced from one another and extending from said housing on separate, parallel rotational axes for respective connection to the drive sources; at least one of said first and second input means adapted to be driven at a rotational speed which is variable with respect to the other of said input means;

axle means rotatably mounted within and extending from said housing along an axis extending transverse to said axes of rotation of said input means for receiving wheels to be driven by the assembly;

differential gear means for transferring rotational motion to said axle means;

output gear means connected between said planetary gear means and differential gear means for transferring said lower speed rotational output from said planetary gear means to said differential gear means; said output gear means including menas for transferring said lower speed rotational output first in a direction transverse to said axes of rotation of said input means and second in a direction parallel to said axes of rotation of said input means for transfer to said differential gear means; said means for transferring said lower speed rotational output including first gear means rotatably mounted on said first input means for engaging said planetary gear means, second gear means rotatably mounted on said second input means for engaging said first gear means, and additional gear means for engaging said second gear means and transferring the rotational output of said second gear means to said differential gear means; means for rotatably mounting said additional gear means for rotation in a plane extending parallel to said rotational axes of said first and second input means; said first and second gear means transferring said lower speed rotational output in said transverse direction while said second and additional gear means transfer said output in said parallel direction;

whereby said gear means constantly mesh and require no clutch for changing between forward, neutral and reverse, said assembly being compact with said input means, differential means and axle means adjacent one another in said housing and allowing efficient lubrication of the various gear means within said housing while obtaining variable speed forward, neutral and reverse rotation of said axle means as desired by varying the speed of rotation of at least one of said input means with respect to the rotational speed of the other of said input means.

* * * * *

UNITED STATES PATENT AND TRADEMARK OFFICE
CERTIFICATE OF CORRECTION

PATENT NO. : 4,726,256

DATED : February 23, 1988

INVENTOR(S) : Roland L. vonKaler and Rocky H. Page

It is certified that error appears in the above-identified patent and that said Letters Patent is hereby corrected as shown below:

Column 15, claim 9, line 33:

After "claim 8" delete --wherein-- (second occurrence).

Column 17, claim 27, line 63:

"sid" should be --said--.

Column 18, claim 27, line 6:

"gear" should be --gears--

Column 19, claim 32, line 15:

"incluidng" should be --including--.

UNITED STATES PATENT AND TRADEMARK OFFICE
CERTIFICATE OF CORRECTION

PATENT NO. : 4,726,256

DATED : February 23, 1988

INVENTOR(S) : Roland L. von Kaler and Rocky H. Page

It is certified that error appears in the above-identified patent and that said Letters Patent is hereby corrected as shown below:

Column 19, claim 36, line 43:

After "bevel" insert --gear--.

Column 21, claim 41, line 53:

"thw" should be --the--.

Column 22, claim 41, line 32

After "said" insert --ring--.

Column 23, claim 42, line 1:

"rot ational" should be --rotational--.

Column 23, claim 42, line 16:

"menas" should be --means--.

Signed and Sealed this

Twenty-ninth Day of November, 1988

Attest:

DONALD J. QUIGG

Attesting Officer

Commissioner of Patents and Trademarks